(12) United States Patent
Somajini

(10) Patent No.: US 10,461,952 B2
(45) Date of Patent: Oct. 29, 2019

(54) SCALABLE SYSTEM AND METHODS FOR MONITORING AND CONTROLLING A SANITARY FACILITY USING DISTRIBUTED CONNECTED DEVICES

(71) Applicant: WATER MANAGER S.à.R.L, Strassen (LU)

(72) Inventor: Claude Somajini, Cagnes sur Mer (FR)

(73) Assignee: WATER MANAGER S.À.R.L, Strassen (LU)

( * ) Notice: Subject to any disclaimer, the term of this patent is extended or adjusted under 35 U.S.C. 154(b) by 113 days.

(21) Appl. No.: 15/544,418

(22) PCT Filed: Jan. 18, 2016

(86) PCT No.: PCT/EP2016/050909
§ 371 (c)(1),
(2) Date: Jul. 18, 2017

(87) PCT Pub. No.: WO2016/116407
PCT Pub. Date: Jul. 28, 2016

(65) Prior Publication Data
US 2017/0346651 A1 Nov. 30, 2017

(30) Foreign Application Priority Data

Jan. 19, 2015 (FR) ...................... 15 00109

(51) Int. Cl.
*H04L 12/28* (2006.01)
*H04Q 9/00* (2006.01)
*G05B 15/02* (2006.01)

(52) U.S. Cl.
CPC ......... *H04L 12/2803* (2013.01); *G05B 15/02* (2013.01); *H04Q 9/00* (2013.01);
(Continued)

(58) Field of Classification Search
CPC ......... H04L 67/12; H04L 41/06; G05B 15/02; G05B 19/0428; G05B 19/4185;
(Continued)

(56) References Cited

U.S. PATENT DOCUMENTS

| | | | | |
|---|---|---|---|---|
| 2,744,541 A | * | 5/1956 | Fleischhauer ......... | F16K 31/524 137/627 |
| 5,937,455 A | * | 8/1999 | Donati ...................... | E03B 1/04 137/426 |

(Continued)

FOREIGN PATENT DOCUMENTS

| | | |
|---|---|---|
| EP | 2605539 | 6/2013 |
| FR | 3007925 | 1/2015 |

(Continued)

OTHER PUBLICATIONS

International Search Report for corresponding International PCT Application No. PCT/EP2016/050909, dated Apr. 29, 2016, pp. 1-4.

*Primary Examiner* — Darrin D Dunn
(74) *Attorney, Agent, or Firm* — Hauptman Ham, LLP

(57) ABSTRACT

A system to control and to monitor the entirety of a sanitary facility by using various specialized connected devices that are distributed throughout the sanitary facility, communicating with one another and over the internet network. Each one of these connected devices carries out its function or functions by using the information communicated by the other connected devices. Each one of these connected devices carries out its function or some of its functions independently in the event of a breakdown in the communication with the other connected devices. From the mobile or fixed apparatuses such as a Smartphone, touchscreen tablet, computer, server, etc. that are connected to the Internet, the user or users can interact with the connected devices, can be (Continued)

alerted in real time to malfunctions, and can receive information regarding the condition of the sanitary facility.

19 Claims, 16 Drawing Sheets

(52) U.S. Cl.
CPC ..... *H04Q 2209/30* (2013.01); *H04Q 2209/40* (2013.01); *H04Q 2209/60* (2013.01); *H04Q 2209/823* (2013.01)

(58) Field of Classification Search
CPC ............ G05B 19/41855; G05B 19/052; G05B 2219/14116; G05B 2219/23051; G05B 2219/25232; G05B 2219/25323; G05B 2219/25428; G05B 2219/2625; G05B 2219/31211; G05B 2219/31324; G05B 2219/31369; E03B 7/071; E03B 7/02; E03B 1/00; E03B 7/075; E03B 1/02; E03B 1/04; E03B 1/042; E03B 7/00; E03B 7/003; E03B 7/04; E03B 7/08; E03B 7/10; G01M 3/2807; Y02A 20/15; Y02A 20/206; G05D 7/0676; Y10T 137/7761; Y10T 137/2536; Y10T 137/2564; Y10T 137/7365; Y10T 137/86445; Y10T 137/8766; C02F 1/006; C02F 2209/003; C02F 2209/001; Y04S 20/40

See application file for complete search history.

(56) References Cited

U.S. PATENT DOCUMENTS

| | | | | |
|---|---|---|---|---|
| 7,225,685 B2* | 6/2007 | Kawamoto | ............... | E03B 7/09 73/861.77 |
| 7,792,126 B1* | 9/2010 | Montestruque | ........... | E03F 7/00 370/386 |
| 7,856,333 B2* | 12/2010 | Scholz | .................. | F15B 19/002 137/118.02 |
| 8,304,699 B2* | 11/2012 | Fliess | .................. | B67D 1/0895 219/492 |
| 8,606,413 B2* | 12/2013 | Picton | .................... | E03B 7/071 700/282 |
| 2003/0041374 A1* | 3/2003 | Franke | ...................... | E03C 1/23 4/689 |
| 2009/0086023 A1 | 4/2009 | McCubbrey | | |
| 2010/0180954 A1* | 7/2010 | Hagler | .................... | F16K 27/07 137/14 |
| 2011/0186154 A1* | 8/2011 | Klicpera | .................. | B67D 7/08 137/551 |
| 2013/0047327 A1* | 2/2013 | Chiu | ....................... | E03D 5/105 4/415 |
| 2013/0061944 A1* | 3/2013 | Tarantino | ................ | E03B 1/042 137/101.27 |
| 2014/0230925 A1* | 8/2014 | Halimi | ................... | G05D 16/20 137/487.5 |
| 2014/0343737 A1* | 11/2014 | Nguyen | .................. | A01G 25/16 700/284 |

FOREIGN PATENT DOCUMENTS

| | | |
|---|---|---|
| RU | 2307898 C2 | 10/2007 |
| WO | 2012/170885 | 12/2012 |

\* cited by examiner

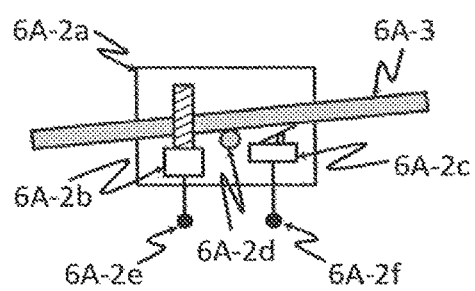
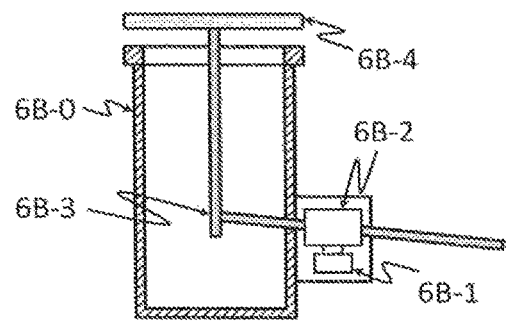
Figure 6A    Figure 6B
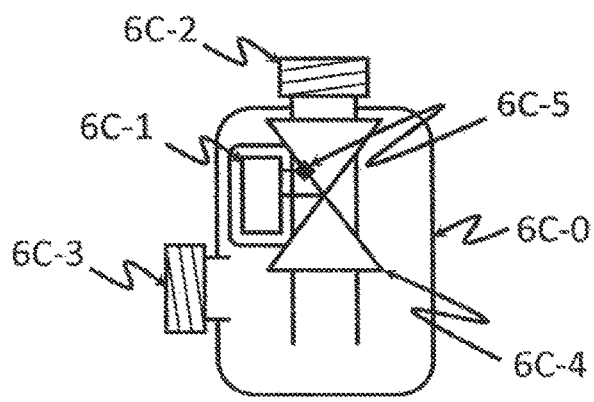
Figure 6C

SCALABLE SYSTEM AND METHODS FOR MONITORING AND CONTROLLING A SANITARY FACILITY USING DISTRIBUTED CONNECTED DEVICES

Conventionally, the manoeuvres for opening or closing water are carried out via a manual action on taps or on valves. It is not generally possible to temporarily isolate a portion of the sanitary facility unless action is carried out manually on one of these taps or one of these valves. Systems exist that make it possible to control a sanitary facility but each one of them is based on a central unit (connected or not) that processes the information coming from sensors and the instructions of the users and controls actuators. There is no interaction between the various sensors and the central unit alone manages the operation of the facility.

With regards to monitoring, there are currently automatic cut-off devices but they must be reset manually if they are triggered. It is also necessary to act directly on these devices in order to deactivate them and reactivate them. An example of this prior art is constituted by document FR2870325. In addition, in order to monitor various points of a water supply network the number of these devices must be multiplied, as the latter do not communicate with one another. It is as such not possible for one of these devices to use the information coming from another of these same devices in order to more effectively detect a malfunction of the sanitary facility such as a leak for example.

Another example of prior art is constituted by document FR3007925. This system makes it possible to monitor and control a sanitary facility but uses a central unit. The sensors-actuators do not communicate with one another but transmit information to the main control-command device that alone manages the entirety of the sensors-actuators. In addition, the uniqueness in the type of the sensors-actuators makes it possible to control and to monitor the sanitary facility only partially.

The purpose of the system according to the invention is to control and to monitor the entirety of a sanitary facility by using various specialised connected devices that are distributed throughout the sanitary facility and that communicate with one another. Each one of these connected devices carries out its function or functions by using the information communicated by the other connected devices. Each one of these connected devices carries out its function or some of its functions independently in the event of a breakdown in the communication with the other connected devices. From the mobile or fixed apparatuses such as a Smartphone, touchscreen tablet, computer, server etc. that are connected to the Internet, the user or users can interact with the connected devices, can be alerted in real time to malfunctions, and can receive information regarding the condition of the sanitary facility.

In the rest of this document the term "system network" is used to designate the network that makes it possible to interconnect the connected devices with one another and to provide for the connections to the internet network. This network can be physically divided into several wireless sub-networks (for example Zigbee, WIFI, 6LoWPAN etc.) and/or wired networks (for example Ethernet, HomePlug etc.) and/or mobile networks (for example GPRS, UMTS, LTE etc.). In this case, connected devices provide the function of gateway in order to switch from one protocol to the other.

In the rest of this document the term "application software" is used to designate an application for Smartphone, touchscreen tablet or any other mobile apparatus or to designate a computer software required in order to dialogue with the system according to the invention.

In the rest of this document the term "remote terminal" is used to designate a mobile or fixed apparatus that is connected to the internet such as a Smartphone, touchscreen tablet, computer, server etc. on which is installed an application software used by the user to interact with the system according to the invention.

In the rest of this document the term "command from the user" is used to designate an action of a user on a remote terminal intended to act on the sanitary facility through the system according to the invention. A command from the user is transmitted via internet then via the system network to the connected device that makes it possible to carry out the action.

In the rest of this document the term "instruction from the user" is used to designate an action of a user on a remote terminal intended to act on the system according to the invention so as to change the parameters or to execute programs such as for example filling a bathtub, topping off a swimming pool, watering the garden etc. An instruction from the user is transmitted via internet then via the system network to the connected device that makes it possible to carry out the action.

In the rest of this document the term "electric valve" is used to designate a device that makes it possible to control or to modify the flow rate of the water in a pipe by using an electric signal such as for example a solenoid valve or a motorised valve.

Monitoring consists, using connected devices that integrate sensors, in detecting anomalies such as for example water leaks, abnormal consumption of the apparatuses connected to the sanitary facility or supply cut-offs. Once an anomaly has been detected by one of the connected devices, the latter sends an alert. According to the severity of the anomaly, or if the user does not react to the alerts, each one of the connected devices comprising the system can intervene for example by cutting off the water over a portion of the sanitary facility or by stopping the apparatus in fault. The information collected by the connected devices can finally be processed and transmitted to the remote terminals in order to visualise the condition of the facility and/or to extract therefrom for example consumption graphs, statistics etc.

Controlling consists in transmitting the commands and instructions of the user received by internet to the connected devices that make it possible to carry out the actions that handle, if necessary, having the actions physically carried out by means of actuators such as for example electric valves. The sensors integrated into the connected devices are also part of the control process by making it possible to verify that the actions have indeed been carried out and, for certain user instructions, to take the measurements required to execute the defined program.

The system according to the invention is comprised of one or several specialised connected devices that are distributed throughout the sanitary facility. Each one of the connected devices that comprises the system according to the invention comprises hardware and software means in order to:
  communicate with the remote terminals connected over the internet through the system network;
  communicate with the other connected devices through the system network;
  process in real time the commands of the user which are intended for it and transmitted through the system network if its function requires it and/or allows it;

record and execute instructions of the user if its function requires it and/or allows it;

transmit in real time information and/or alerts through the system network if its function requires it and/or allows it;

record and execute the instructions of the user if its function requires it and/or allows it.

The invention will be understood better when reading the following description, provided solely as an example and given in reference to the annexed drawings wherein:

FIGS. 6A to 6C show examples of possible embodiments and integrations for a "drainage plug" connected device according to the invention;

All of the connected devices according to the invention integrate an electronic interface that provides
  the interface with the system network;
  the interface with the required sensors and actuators;
  the processing of information that makes it possible to carry out the function or functions of the connected device according to the invention.

This electronic interface also makes it possible to provide the function of a gateway in order to switch from one protocol to the other.

Figure 1A:
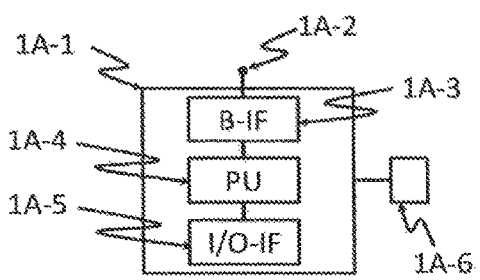
FIGS. 1A to 1C show a few possible example embodiments for the electronic interface integrated into all of the connected devices according to the invention.

FIG. 1A shows an example of a possible embodiment for the electronic interface. The electric cable that supports the wired system network is connected to the connector (1A-2) in order to connect the device to the system network. This cable can furthermore provide the electrical power supply of the connected device. The interface bus (1A-3) assure the adaptation of the signals in order to communicate over the bus. The logic processing unit (1A-4) comprised the hardware means (microprocessor, memoires etc.) and software means in order to carry out the function or functions of the connected device. If necessary, the control of the actuators and/or the reading of the sensors that are indispensable for the operations of the connected device according to the invention are carried out through the input/output interface (1A-5) which allows for the adaptation of the signals. The electrical power supply (backup if the cable of the system network provides the main power supply) of the connected device is supplied by the power supply unit (1A-6). This can be a simple electronic battery, an accumulator with or without the charger thereof, a main power supply, etc.

Figure 1B:
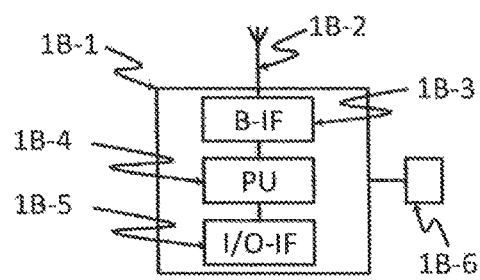

FIG. 1B shows another example of a possible embodiment for the electronic interface (1B-1). This embodiment includes some of the elements shown in FIG. 1A namely the logic processing unit (1B-4) and the input/output interface (1B-5) and the power supply unit (1B-6). The interface bus (1B-3) comprises means for emitting and for receiving electromagnetic signals in order to communicate over the wireless system network through the antenna (1B-2) which is built-in or not.

Figure 1C:
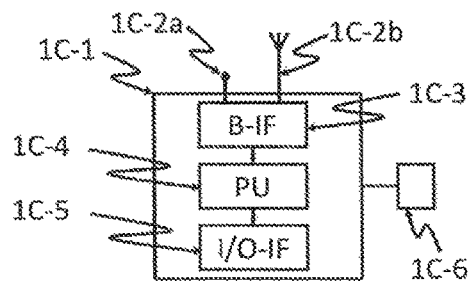

FIG. 1C shows another example of a possible embodiment for the electronic interface (1C-1). This embodiment includes some of the elements shown in FIG. 1B namely the logic processing unit (1C-4), the input/output interface (1C-5) and the power supply unit (1C-6). The interface bus (1C-3) makes it possible to communicate over 2 sub-network systems, one wired and the other wireless. It comprises means for emitting and for receiving electromagnetic signals in order to communicate over the wireless system network through the antenna (1C-2b) which is built-in or not. The electric cable that supports the wired system network is connected onto the connector (1C-2a). As such the electronic interface makes it possible to ensure the function of a gateway in order to switch from one protocol to the other.

Figure 1D:
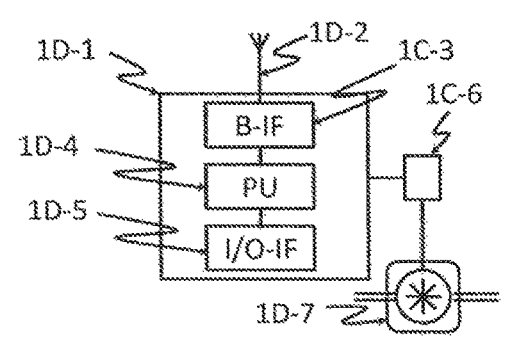

FIG. 1D shows another example of a possible embodiment for the electronic interface (1D-1) with all of the connected devices according to the invention. This embodiment includes some of the elements shown in FIG. 1B namely the antenna (1D-2), the interface bus (1D-3), the logic processing unit (1D-4) and the input/output interface (1D-5). The electrical power supply of the connected device is supplied by an accumulator (1D-6). This accumulator is recharged by a generator (1D-7) run par the flow rate of the water circulating in a pipe of the sanitary facility, generally the pipe that supports the connected device. This provides the connected device with complete autonomy.

The "sensor-actuator" connected device makes it possible, by being connected to a pipe of the sanitary facility, to monitor and to control the distribution of the water over this pipe.

Figure 2A:
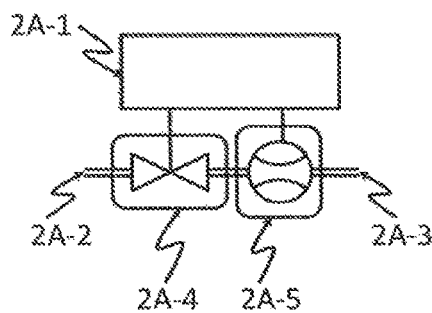
FIGS. 2A to 2C show a few examples of possible embodiments and integrations for a "sensor-actuator" connected device according to the invention.

FIG. 2A shows an example of a possible embodiment for a "sensor-actuator" connected device according to the invention. It is connected by the inlet (2A-2) and the outlet (2A-3). This device ins therefore installed as a conventional valve. It comprises an electric valve (2A-4) that makes it possible to open or close the water downstream of the device. This is the actuator portion of the device. A flow rate sensor (2A-5) provides an electric signal of which at least one of the characteristics varies according to the flow rate circulating in the pipe. This is the sensor portion of the device. The electric valve and the flow rate sensor are connected to the electronic interface (2A-1).

Figure 2B:
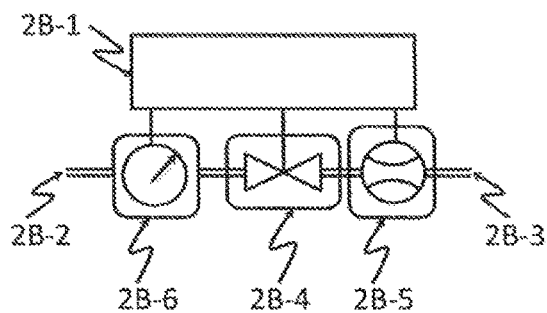

FIG. 2B shows another example of a possible embodiment for a "sensor-actuator" connected device according to the invention. This embodiment includes the same elements as the one shown in FIG. 2A for the electronic interface (2B-1), the connections on the pipe of the sanitary facility (2B-2 and 2B-3), for the actuator portion (2B-4) and for the flow rate sensor (2B-5). The sensor portion of the device is supplemented by a pressure sensor (2B-6) supplying an electric signal of which at least one of the characteristics varies according to the pressure measured at the inlet of the "connected sensor-actuator" device.

Figure 2C:
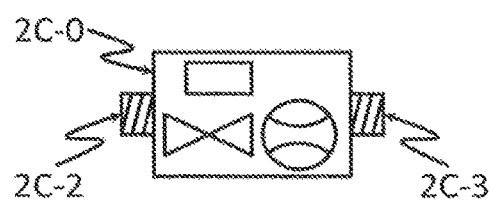

FIG. 2C shows an example of a possible integration for a "sensor-actuator" connected device according to the invention. The body of the device (2C-0) encloses the sensors, the electric valve and the electronic interface. Then the connection on the pipe of the sanitary facility is made using the fittings (2C-2) for the inlet and (2C-3) for the outlet.

A sanitary collector makes it possible to distribute water from the inlet to several pipes connected to the outlets of the device. It makes it possible to carry out networks referred to as "octopus". The "sanitary collector" connected device makes it possible, in addition to this first function, to monitor and to control the distribution of the water over the pipes connected to the outlets thereof. The device is in part characterised by the number of outlets.

Figure 3A:
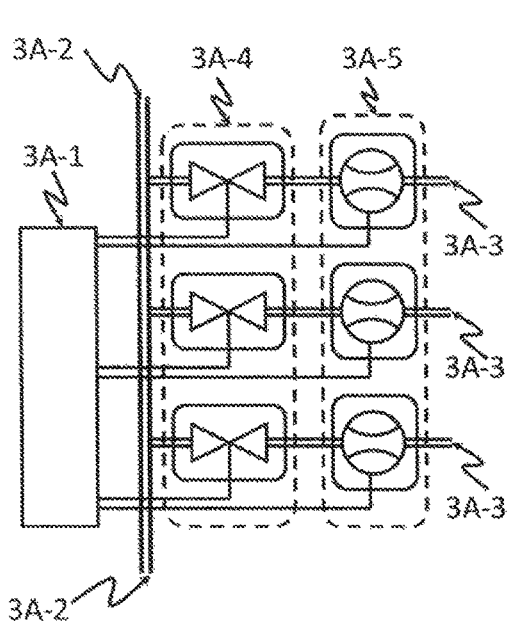
FIGS. 3A to 3D show a few possible examples of embodiments and integrations for a "sanitary collector" connected device according to the invention.

FIG. 3A shows an example of a possible embodiment for a "multi cut-off sanitary collector" connected device with 3 outlets according to the invention. It is largely inspired from the "sensor-actuator" connected device. The water inlet is connected to one of the inlets (3A-2) located at each end of the device. This makes it possible to place several "sanitary collector" connected devices in series. The pipes are connected to the outlets (3A-3). This device is installed instead of a conventional sanitary collector. It includes electric valves (3A-4) that make it possible to open or to close the water on each outlet of the device. The flow rate sensors (3A-5) each provide an electric signal of which at least one of the characteristics varies according to the flow rate circulating in each one of the pipes connected to the outlets. The electric valves and the flow rate sensors are connected to the electronic interface (3A-1). This embodiment therefore makes it possible to monitor and to control each pipe independently of each other.

Figure 3B:
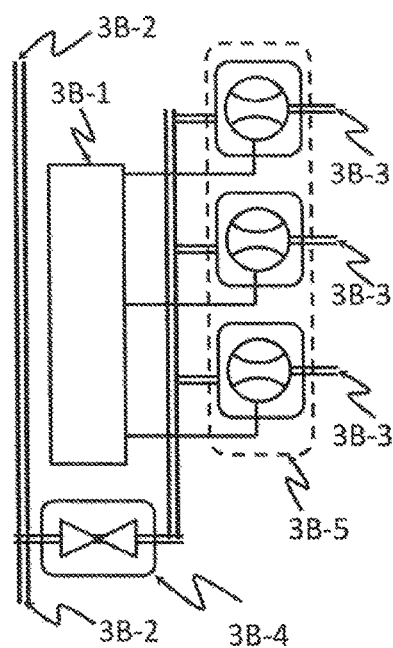

FIG. 3B shows an example of a possible embodiment for a "single cut-off sanitary collector" connected device with 3 outlets according to the invention. This embodiment includes the same type of elements as the one shown in FIG. 3A such as the electronic interface (3B-1), the inlet connections (3B-2) and the outlet connections (3B-3) in order to connect it to the sanitary facility and the sensors (3B-5) and the electric valve (3B-4). But there is in this example only a single electric valve which makes it possible to cut off the water supply of all of the pipes connected to the outlets. This embodiment therefore makes it possible to monitor each pipe independently of each other but makes it possible to control them only all together.

Figure 3C:
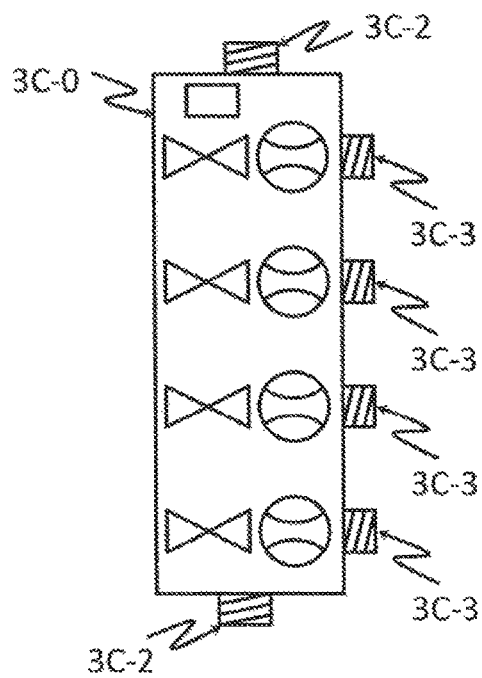

FIG. 3C shows an example of a possible integration for a "multi cut-off sanitary collector" connected device with 4 outlets. The body of the device (3C-0) encloses the flow rate sensors, the electric valves and the electronic interface. Then the connection on the pipe of the sanitary facility is made using the fittings (3C-2) for the inlets and (3C-3) for the outlets.

Figure 3D:
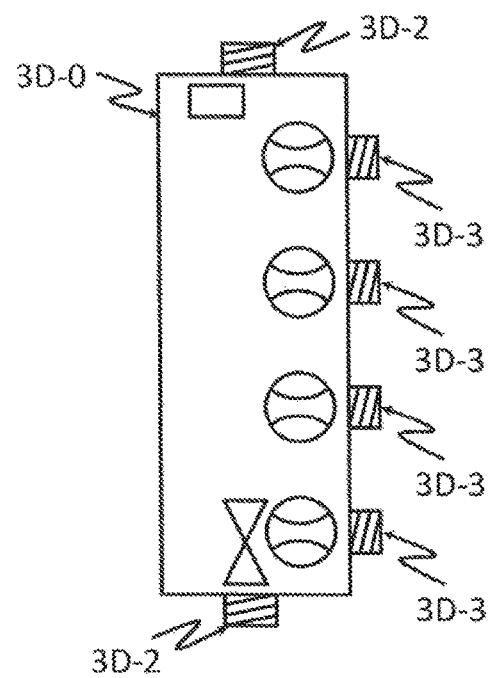

FIG. 3D shows two possible integrations examples for a "single cut-off sanitary collector" connected device with 4 outlets. The body of the device (3D-0) encloses the flow rate sensors, the electric valve and the electronic interface. Then the connection on the pipe of the sanitary facility is made using the fittings (3C-2) for the inlets and (3C-3) for the outlets.

For further flexibility in the sanitary facilities it is possible to make the sanitary collectors modular. It is as such possible to scale the facility by adding modules making it as such possible to add an outlet to the collector. This is the purpose of the "modular sanitary collector" connected device. It is comprised of a basic module and of additional modules that are placed one on the other.

Figure 4A:
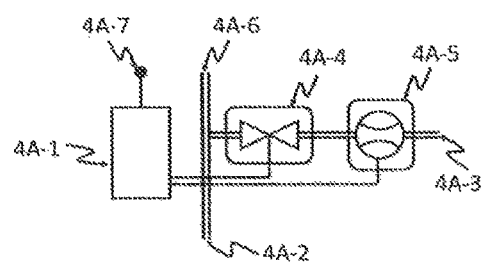
FIGS. 4A to 4F show a few possible examples of embodiments and integrations for a "modular sanitary collector" connected device according to the invention.
Figure 4B:
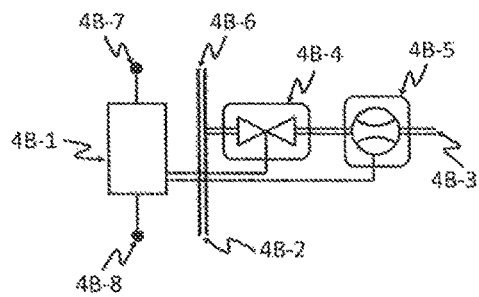
Figure 4C:
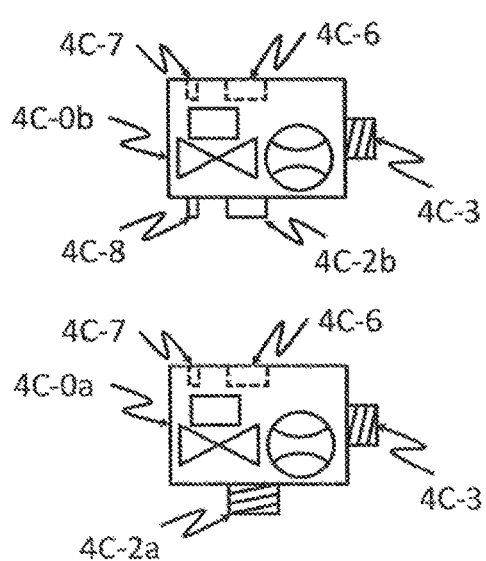
Figure 4C:
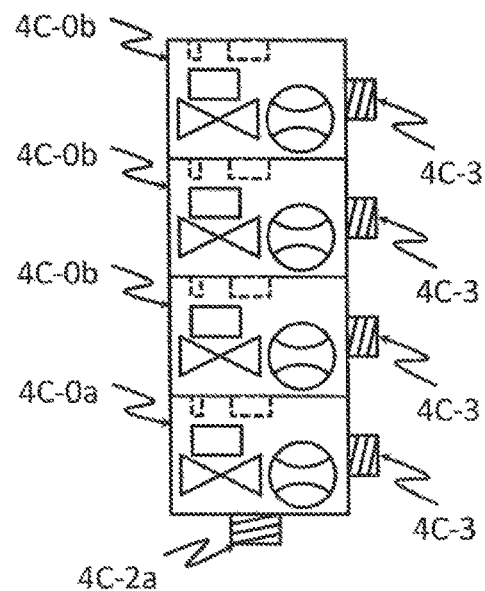

FIGS. 4A to 4C show a possible example of an embodiment and integration for a "multi cut-off modular sanitary collector" connected device according to the invention. This embodiment makes it possible to monitor and to control each pipe independently of each other.

FIG. 4A shows an example of a possible embodiment for the basic module. II includes the same type of elements as the one shown in FIG. 3A. The water inlet pipe is connected to the inlet (4A-2). The first pipe is connected to the outlet (4A-3). The electric valve (4A-4) makes it possible to open or to close the water on the outlet of the device. The flow rate sensor (4A-5) provides an electric signal of which at least one of the characteristics varies according to the flow rate circulating in the pipe connected to the outlet. The electric valve and the flow rate sensor are connected to the electronic interface (4A-1). The electronic interface also provides, if necessary, the function of a gateway for communicating over the wired sub-system network. The latter is connected to a connector (4A-7) in order to connect an additional module to the system network. The outlet (4A-6) makes it possible to connect the inlet of this additional module.

FIG. 4B shows an example of a possible embodiment for the additional module. This additional module is connected to the basic module (or to another additional module) via the inlet (4B-2) and via the electrical connector (4B-8). The additional module is as such connected to the water inlet and to the system network. This additional module includes some of the elements of the basic module shown in FIG. 4A such as the outlet (4B-3), the electric valve (4B-4), the flow rate sensor (4B-5), the outlet to another additional module (4B-6) and the connector of the system network (4B-7). The electronic interface (4B-1) communicates only through the wired system network distributed by the basic module.

FIG. 4C shows two possible integrations examples for the basic module (4C-0a) and the additional modules (4C-0b) as well as the assembly thereof in order to form a "multi cut-off modular sanitary collector" connected device with 4 outlets. The connection on the pipes of the sanitary facility is made using the fittings (4C-2a) for the inlet and (4C-3) for the outlets. The fittings (4C-6) and (4C-2b) and the electrical connectors (4C-7) and (4C-8) make it possible to connect the modules with one another.

Figure 4D:
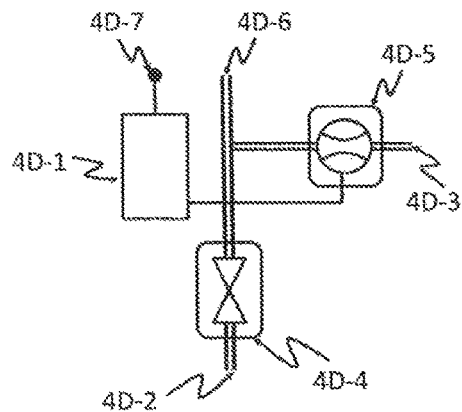
Figure 4E:
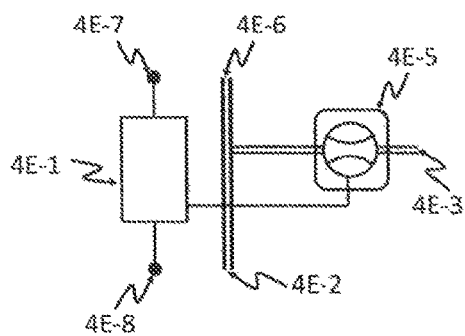
Figure 4F:
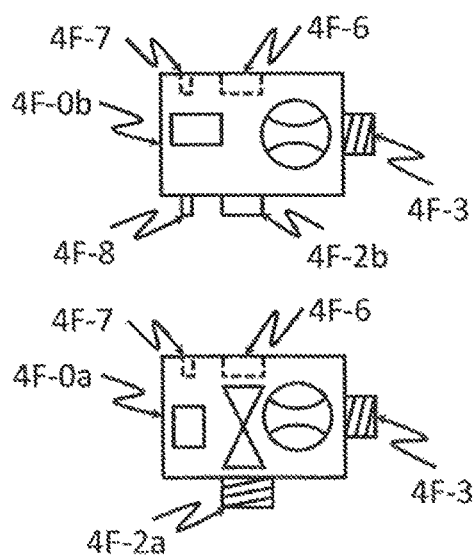
Figure 4F:
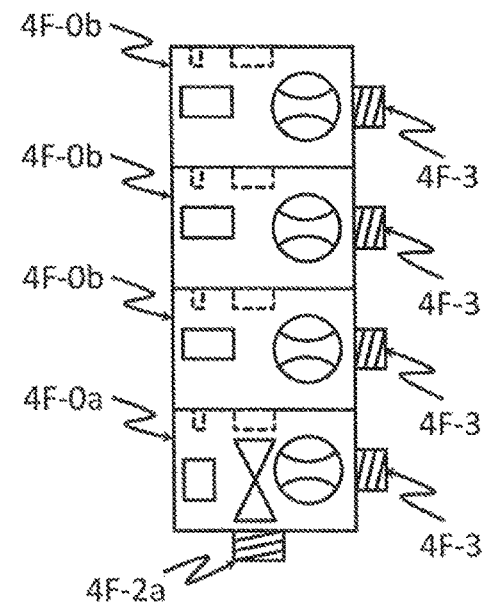

FIGS. 4D to 4F show another possible example of an embodiment and integration for a "single cut-off modular sanitary collector" connected device according to the invention. This embodiment makes it possible to monitor each pipe independently of each other but only makes it possible to control them all together.

FIG. 4D shows an example of a possible embodiment for the basic module. This basic module includes the same elements as the one shown in FIG. 4A. The only difference is the connection of the electric valve (4D-4). The latter directly closes the water inlet and cuts off the water at the outlet (4D-3) as well as at the outlet (4D-6). This embodiment therefore simultaneously controls the outlets of all of the additional modules in addition to that of the basic module.

FIG. 4E shows an example of a possible embodiment for the additional module. This additional module includes all of the elements of the one shown in FIG. 4C except for the electric valve. Indeed, as the basic module simultaneously controls all of the outlets the electric valve is no longer necessary.

FIG. 4F shows two possible integration examples for the basic module (4F-1) and the additional modules (4F-2) as well as the assembly thereof in order to form a "single cut-off modular sanitary collector" connected device with 4 outlets. The connection on the pipes of the sanitary facility is made using the fittings (4F-2a) for the inlet and (4F-3) for the outlets. The fittings (4F-6) and (4F-2b) and the electrical connectors (4F-7) and (4F-8) make it possible to connect the modules with one another.

It is important to be able to monitor the taps present on a sanitary facility. Indeed, they are often the source of leaks or are sometimes simply forgotten and left in open position. It is possible to resolve these disadvantages by using a "sensor-actuator" connected device but in this case the entirety of the pipe is cut off in the case of an anomaly. In addition, the system will not distinguish between a leak and something forgotten. In order to respond to this need the system proposes a "simple tap" or "two handles mixing tap" or "single handle mixing tap" connected device. The two handles mixing tap are however much more used today than single handle mixing tap. The examples provided in this document are produced around a single handle mixing tap but can be transposed to a conventional tap or to a two handles mixing tap by simply adapting the mechanism or mechanisms for manoeuvring.

Figure 5A:
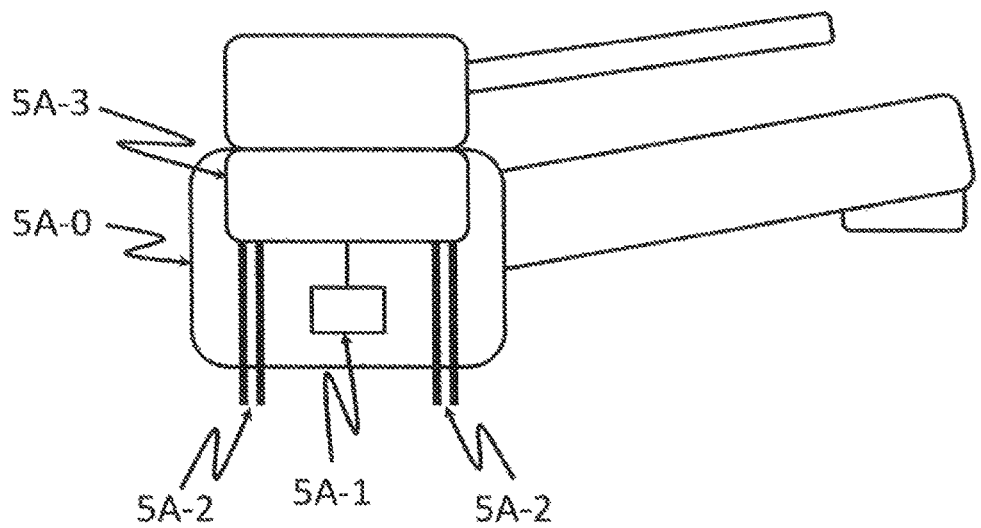
FIGS. 5A to 5D show a few possible examples of embodiments and integrations for a "two handles mixing tap" connected device according to the invention.

FIG. 5A shows an example of a possible embodiment for the "two handles mixing tap" connected device according to the invention. The body (5A-0) integrates the cartridge (5A-3) that carries out the mixing function and which comprises a sensor integral with the mechanism that makes it possible to know if the tap is open or not. That is why the cartridge is connected to the electronic interface (5A-1). The water inlets (5A-2) directly supply the cartridge of the two handles mixing tap. This simple device thus allows the system to know if the tap is open or not. Note that this "connected tap" device can be added to any tap by fastening the device onto the opening/closing mechanism.

Figure 5B:
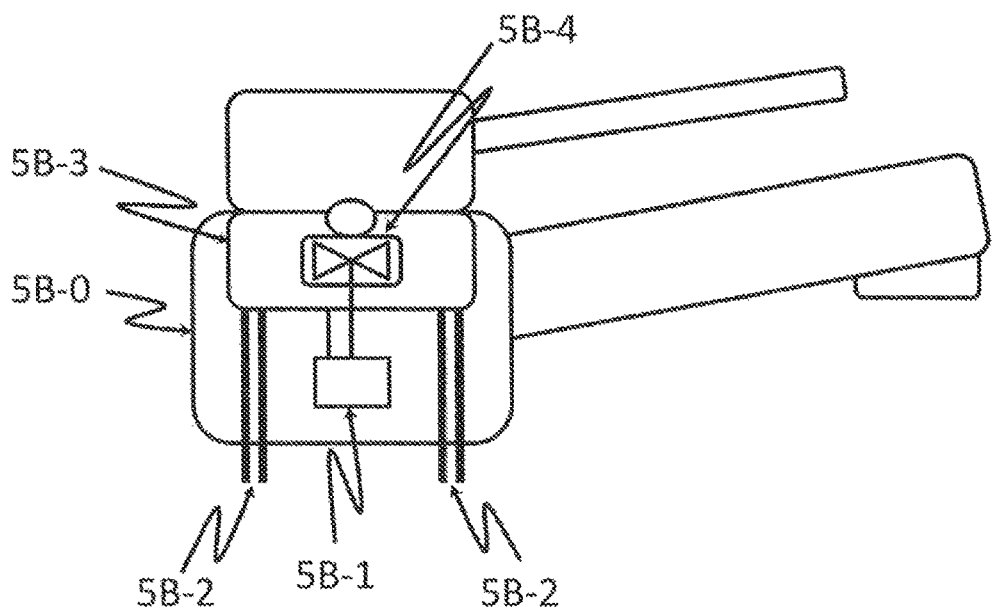

FIG. 5B shows another example of a possible embodiment for the "two handles mixing tap" connected device according to the invention. This device includes the elements of the one shown in FIG. 5A. It adds however an electric valve (5B-4) on the cartridge with a sensor (5B-3) and is integral with the manual manoeuvring mechanism of the tap. This electric valve as such provides the control of the two handles mixing tap.

Figure 5C:
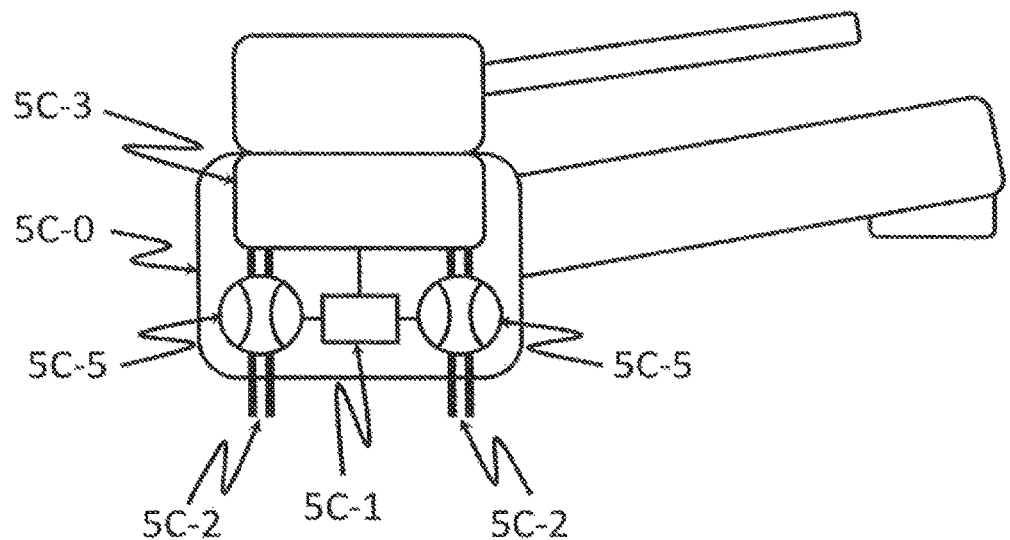

FIG. 5C shows another example of a possible embodiment for the "two handles mixing tap" connected device according to the invention. This device includes some of the elements of the one shown in FIG. 5A such as the body (5C-0), the cartridge with a sensor (5C-3), the electronic interface (5C-1) and the hot water and cold water inlets (5C-2). Two flowmeters (5C-5), one for the hot water and the other for the cold water, are inserted between each inlet and the cartridge. The monitoring is as such more precise.

Figure 5D:
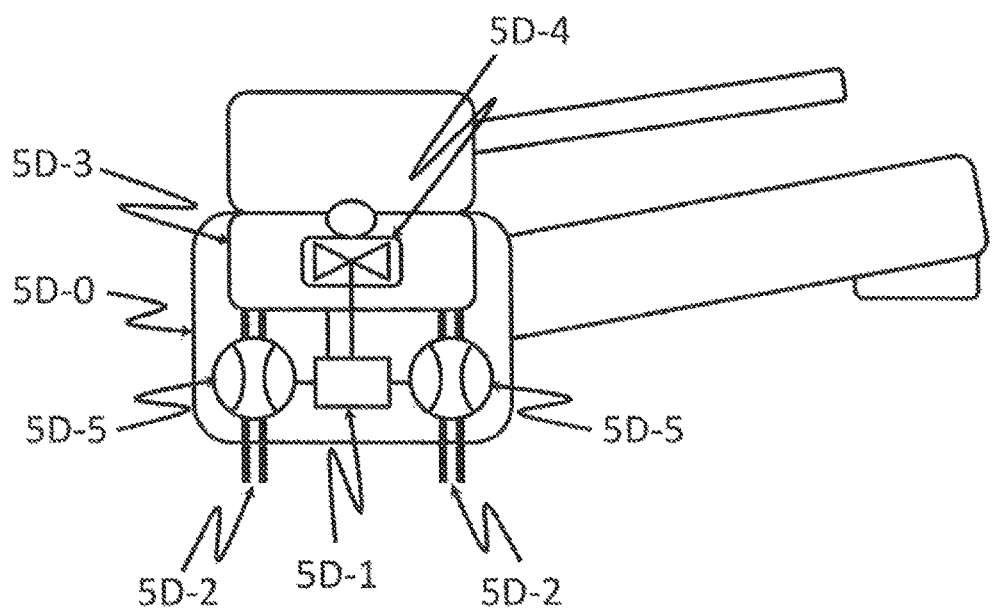

FIG. 5D shows another example of a possible embodiment for the "two handles mixing tap" connected device according to the invention. This device includes the elements of the one shown in FIG. 5C. It adds however an electric valve (5D-4) on the cartridge with a sensor (5D-3) and is integral with the manual manoeuvring mechanism of the tap. This electric valve as such provides the control of the "two handles mixing tap".

One of the major problems for carrying out home automation over a sanitary facility is the controlling and the monitoring of drainage plugs. Indeed, in order to fill a bathtub for example the plug must first be closed and ensure that this action has indeed been carried out. In the event of a sink full of water, it has to be possible to open the plug in order to empty it. The "drainage plug" connected device intends to respond to this problem.

FIG. 6A shows an example of a possible embodiment for the module detector-actuator (6A-2a) of the "drainage plug" connected device according to the invention. The manoeuvring rod of the plug (6A-3) can pivot about the axis (6A-2d). The opening and closing actions are provided by the endless screw motor (6A-2b). The detector (6A-2c) indicates the position of the manoeuvring rod. The connectors (6A-2e and 6A-2f) makes it possible to connect the detector and the motor to the electronic interface. This simple device therefore makes it possible to manoeuvre the plug and to check its position.

FIG. 6B shows an example of a possible embodiment for the "drainage plug" connected device according to the invention. The body of the plug (6B-0) is seen as a cross-section. This makes it possible to see the manoeuvring rods (6B-3) of the plug (6B-4). The module detector-actuator (6B-2) provides the functions of manoeuvring and of verifying the position of the plug. This module is connected to the electronic interface (6B-1).

FIG. 6C shows another possible example of an embodiment and integration for the "drainage plug" connected device according to the invention. In this example, the "connected plug" device is integrated into the drainage siphon (6C-0). It is comprised of an electric valve (6C-4) and of the electronic interface (6C-1). The electric valve is provided with a position sensor (6C-5) in order to detect that the electric valve is indeed open or indeed closed. The electric valve and the position sensor are connected to the electronic interface. The fittings (6C-2 and 6C-3) make it possible to connect the siphon to the sanitary equipment and to the drain. This integration to the siphon makes it possible to simply equip most sinks, washbasins, bathtubs etc.

The flush tank is a high water consumption device in homes. For a long time now, manufacturers have developed two-volume systems that make it possible to save water. But these systems are static in that it is not possible to change the settings of the level of the tank easily. The "float valve" connected device makes it possible to respond to this problem. This device can as such be used for other water tanks such as swimming pools etc.

Figure 7A:
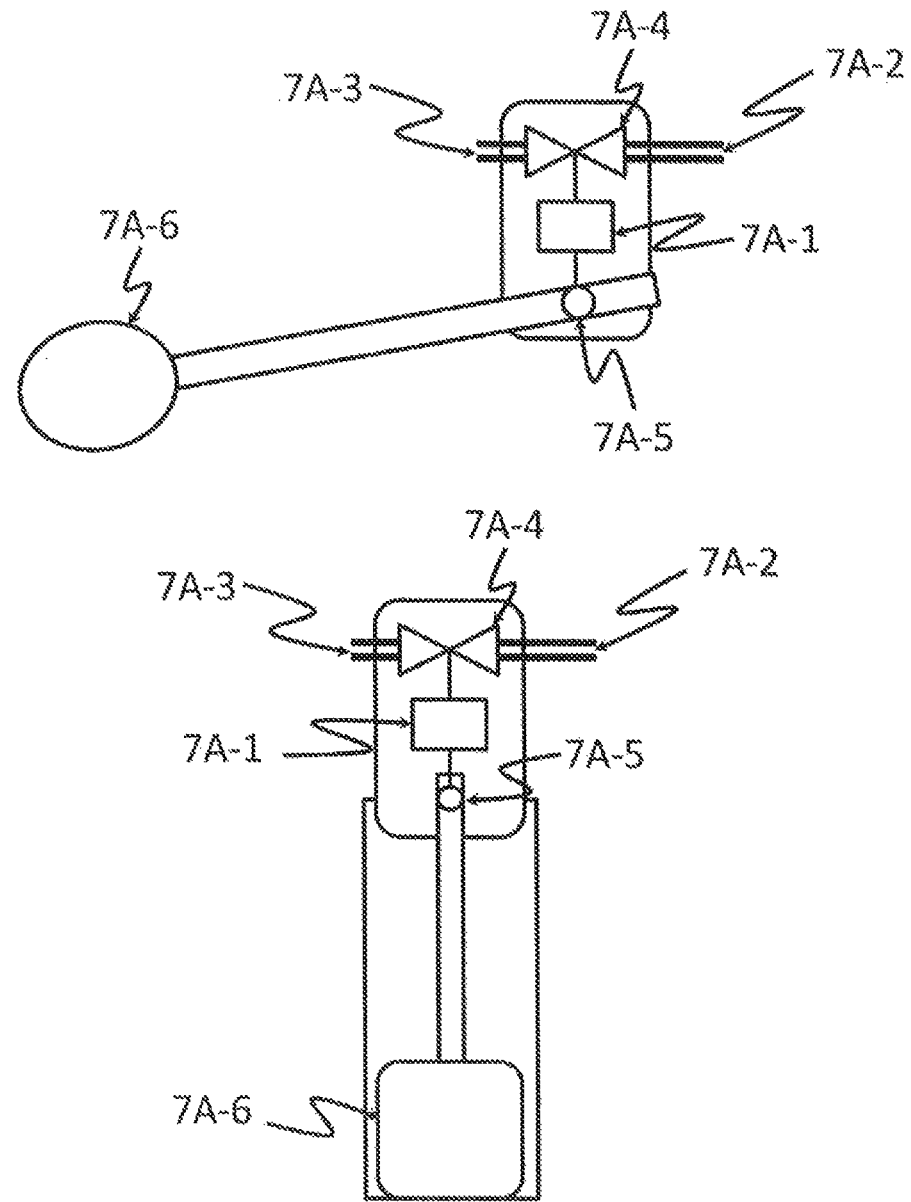
FIG. 7A shows two examples of possible embodiments and integrations for a "float valve" connected device according to the invention.

FIG. 7A shows two possible examples of embodiments for the "float valve" connected device according to the invention. The float (7A-6) actuates the position sensor (7A-5). The level of water in the tank is as such detected and transmitted to the electronic interface (7A-1). The electric valve (7A-4) makes it possible to control the water from the inlet (7A-2) to the outlet (7A-3). The system can as such fill the tank when the float arrives below a certain level. The system can also control the level of filling if the tank. The user can as such very simply set the maximum filling level of the tank. Moreover, the system also monitors the filling by measuring the position of the float.

The higher the number of pieces of sanitary equipment connected to the system is, the more precise the monitoring and the controlling of the facility is. It is therefore useful to be able to directly equip household sanitary equipment such as washing machines, refrigerators, coffee machines, etc. The electronic interface can be integrated into all of the sanitary equipment when it is manufactured or be added subsequently by a technician in order to form a "sanitary equipment" connected device. A simple and functional API allows for communication with the other connected devices. The configuration must be easy and carried out from the remote terminals. The system can therefore communicate directly with the equipment connected as such and therefore monitor it and control it if necessary.

It often occurs that equipment leaks although everything appears to be normal when examining the water inlet. Mention can be made of the example of a leak on the emptying pump of a washing machine. In this case none of the devices described until now proposes a solution. The "humidity detector" connected device intended to response to this need.

Figure 8A:
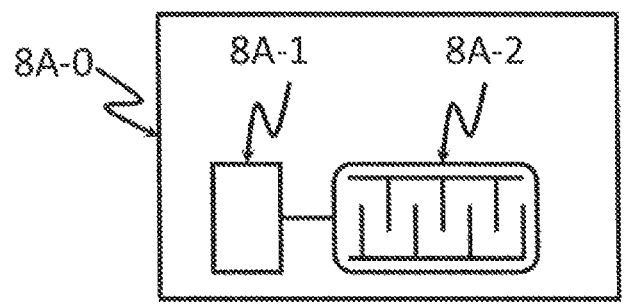
FIGS. 8A and 8B show an example of an embodiment and possible use for a "humidity detector" connected device according to the invention.

FIG. 8A shows an example of a possible embodiment for the "humidity detector" connected device according to the invention. The body of the device (8A-0) integrates a humidity sensor with electrodes (8A-1) connected to the electronic interface (8A-2). This simple devices makes it possible for example to detect water on the floor.

Figure 8B:
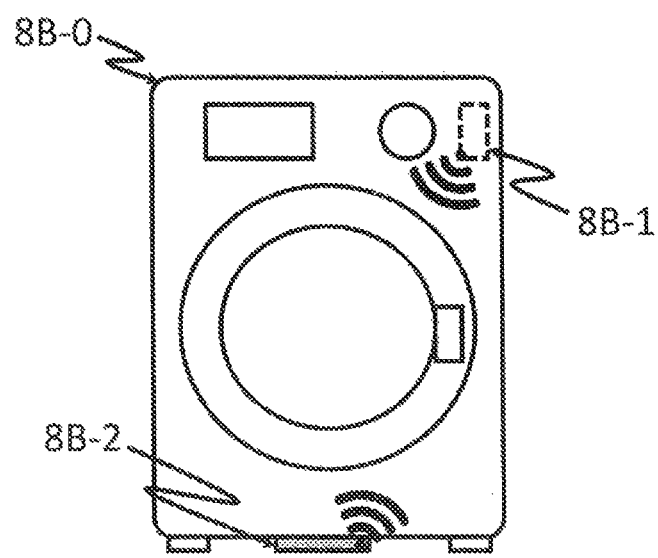

FIG. 8B shows a possible example of a method of use for the "sanitary equipment" (8B-0) and "humidity detector" (8B-2) connected devices according to the invention. A washing machine is provided with an electronic interface (8B-1) which makes it a "sanitary equipment" connected device (8B-0) according to the invention. If the "humidity detector" connected device (8B-2) placed under the washing machine detects water, it sends an art captured by the washing machine which can interrupt its program and transmit in turn an alert.

Figure 9:
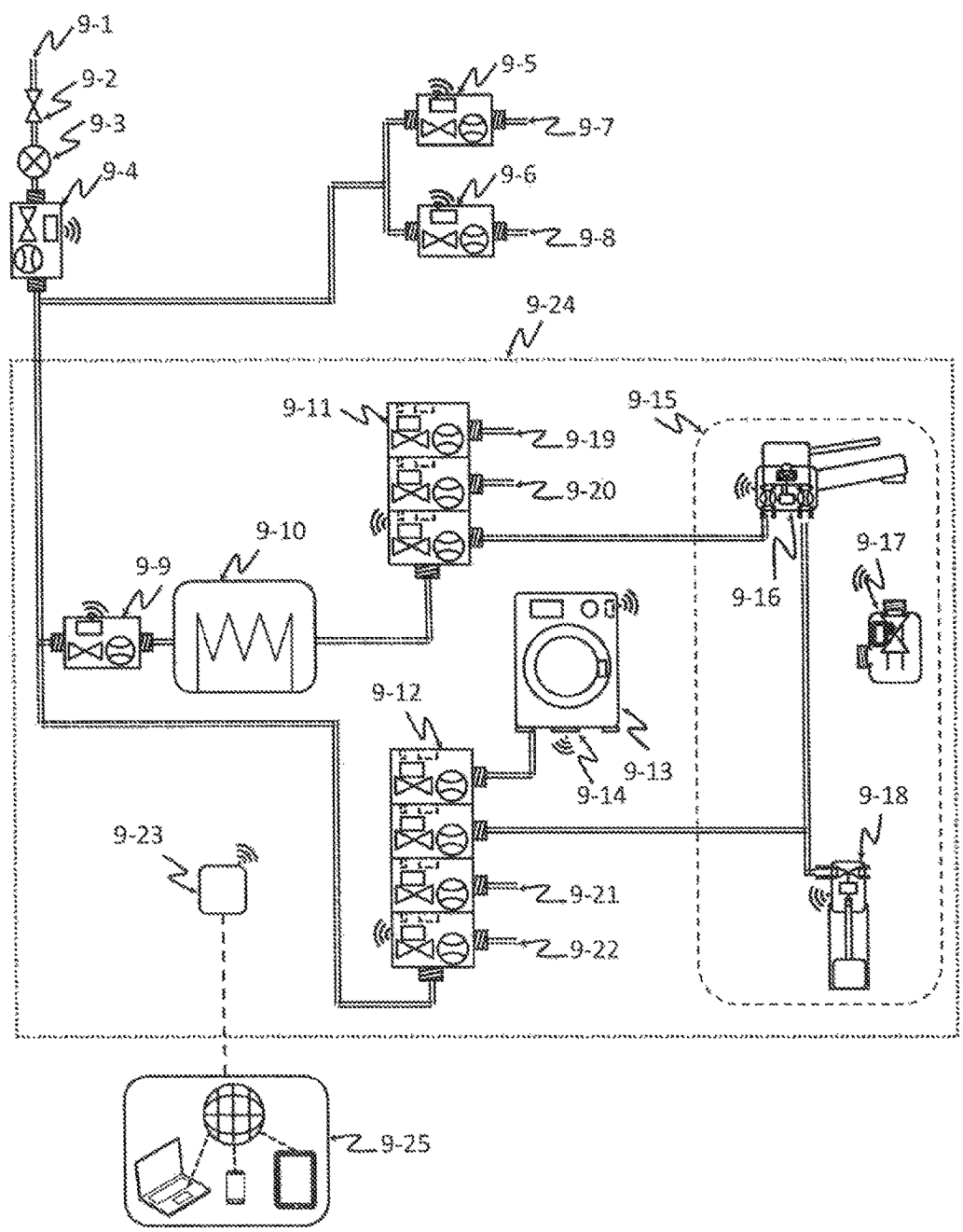
FIG. 9 shows an embodiment of the system for monitoring and controlling a sanitary facility via connected devices.

FIG. 9 shows an embodiment of the system for monitoring and controlling a sanitary facility via connected devices. This system comprises a series of connected devices with each one of them participating in the monitoring and in the controlling of a specific part of the sanitary facility. The first "sensors-actuators" connected device (9-4) is installed at the head of the network immediately after the water inlet (9-1), the general shutoff valve (9-2) and the general meter (9-3). It therefore monitors and controls the entirety of the sanitary facility. Then there are two other "sensors-actuators" (9-5) and (9-6) connected devices placed immediately before the outlets to the garden (9-7) and to the swimming pool (9-8). These first three connected devices are located outside of the house (9-24). The "sensors-actuators" connected device (9-9) is placed immediately before the apparatus for producing hot water (9-10). It participates in the monitoring and in the controlling of the hot water sub-network of the sanitary facility, including the apparatus for producing hot water. The "multi cut-off modular sanitary collector" connected device with 3 outlets (9-11) monitors and controls each hot water outlet to the kitchen (9-19), to the bathroom (9-20) and to the toilettes (9-15). The "multi cut-off modular sanitary collector" connected device with 4 outlets (9-12) monitors and controls each cold water outlet to the kitchen (9-21), to the washing machine (9-13), to the bathroom (9-22) and to the toilettes (9-15). In the toilettes (9-15) there is a washbasin provided with "two handles mixing tap (9-16) and "drainage plug" (9-17) connected devices. There is also a flush tank of which the tank is provided with a "float valve" connected device (9-18) which provides the controlling and the monitoring of the filling of the tank. The entirety of the connected devices is connected to the system network via a Zigbee wireless connection. The ADSL box (9-23) already present in the house (9-24) and allowing for the connection to the internet network (9-25) is connected to the entirety of the connected devices via the Zigbee connection with which it is pre-equipped.

Figure 10:
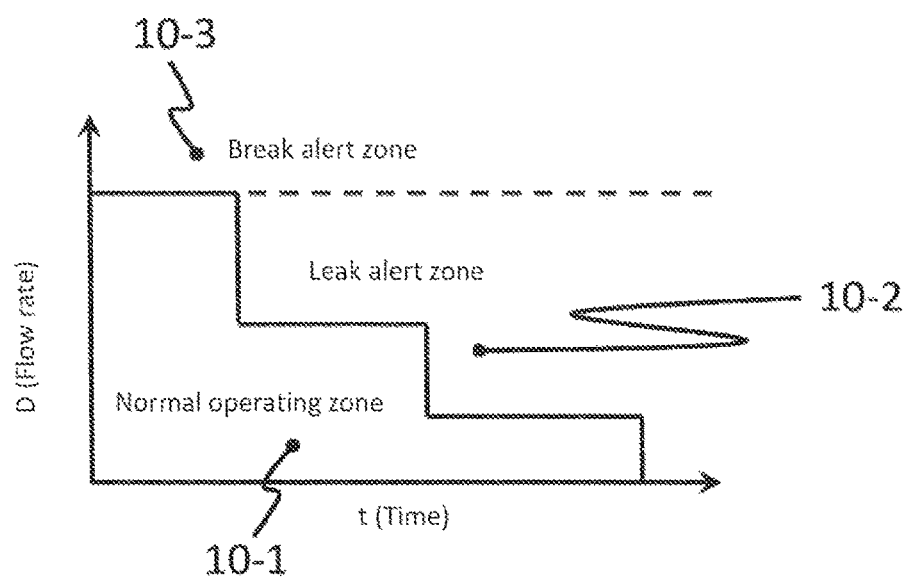
FIG. 10 shows in the form of a graph an example of a template setting the operating zones for the water points that do not have a connected device that integrates a flow rate sensor.

FIG. 10 shows in the form of a graph a template that sets the operating limits for a water point that does not have a dedicated connected device integrating a flow rate sensor. The templates of several water points that do not have a dedicated connected device integrating a flow rate sensor can be used in order to form only one that represents the operating limits for the water outlet of the connected device supplying these water points. The normal operating zone (10-1) is the zone wherein the flow rate/time pair must remain. If the flow rate/time pair passes into the leak alert zone (10-2), the connected device that supplies this or these water points must emit an alert signal. If the flow rate passes above in the break alert zone (10-3), the connected device that supplies this or these water points must cut off the water supply and emit a break alert signal.

Figure 11:
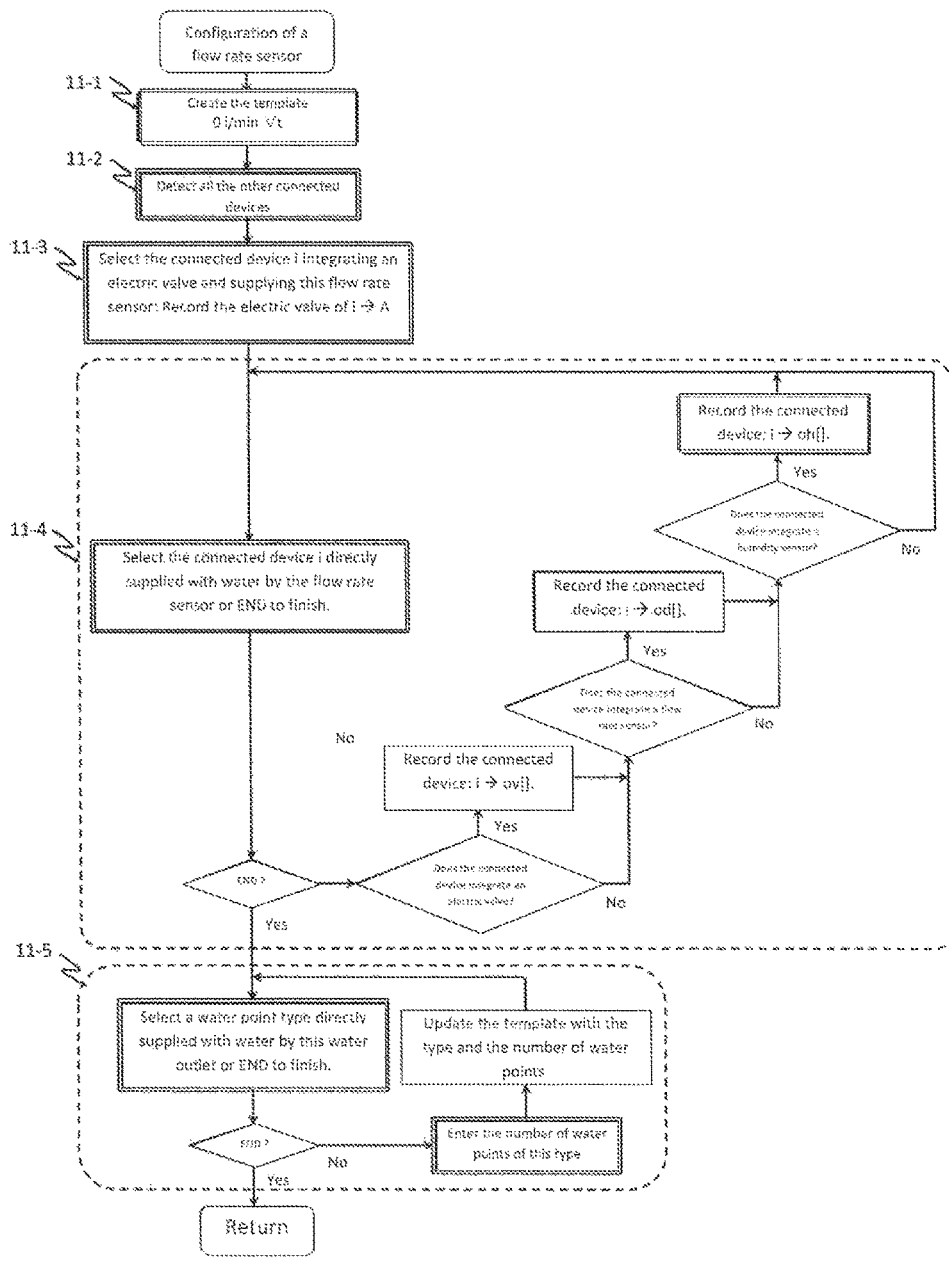
FIG. 11 shows in the form of a flowchart a method for configuring for each flow rate sensor of the connected devices.

FIG. 11 shows in the form of a flowchart a method for configuring for each flow rate sensor of the connected devices. The first step (11-1) consists in creating a template setting the operating limits to:

$$D=0 \text{ l/min } \forall t$$

Where D designates the flow rate and t designates the time. The following step (11-2) allows the connected device to detect the other devices connected to the system network. The following step (11-3) allows the user to define the connected device that integrates the electric valve supplying said flow rate sensor configured by said method. This electric valve is recorded in the variable A. The following step (11-4) is a loop that allows the user to define the entirety of the connected devices that are directly supplied with water by this outlet. These connected devices are recorded in lists according to the following algorithm:

If the connected device integrates an electric valve the latter is recorded in the list referred to as "ov";

If the connected device integrates a flow rate sensor the latter is recorded in the list referred to as "od";

If the connected device integrates a humidity sensor it is recorded in the list referred to as "oh";

The loop (11-5) allows the user to define the water points that do not have a connected device and directly supplied with water by this water outlet. During this loop the logic processing unit develops the template that represents the operating limits for these water points.

Figure 12:
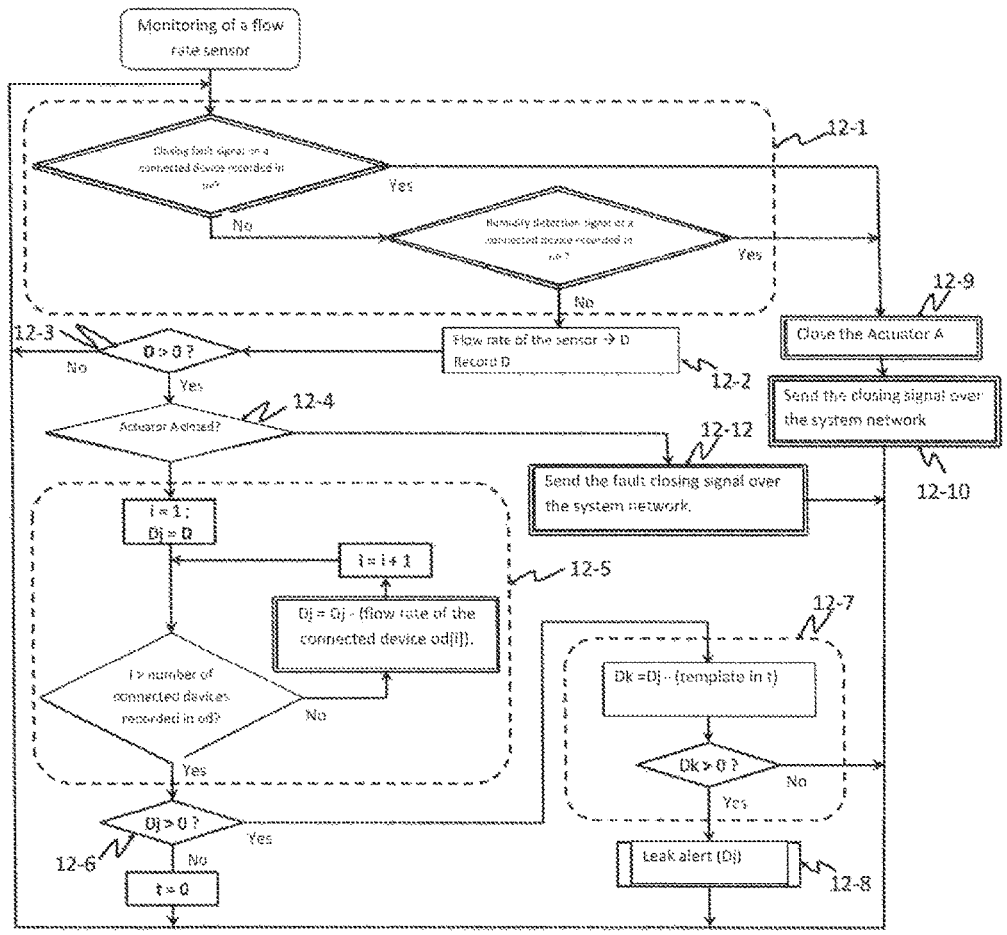
FIG. 12 shows in the form of a flowchart a method for monitoring for each flow rate sensor of the connected devices.

FIG. 12 shows in the form of a flowchart a method for monitoring for each flow rate sensor of the connected devices. The first step (12-1) makes it possible to react if one of the connected objects of which the electric valve is recorded in the list "ov" has sent a signal indicating that this electric valve does not close or if one of the connected objects recorded in the list "oh" has sent a signal indicating that it has detected humidity. In one of these cases, the step (12-9) closes the electric valve "A", the step (12-10) sends a "closing" alert. Otherwise, the following step (12-2) measures the value D provided by the flow rate sensor monitored by this method. The following step (12-3) verifies if this flow rate D is greater than 0 l/min. The following step (12-4) checks that the electric valve "A" is not closed. If the electric valve "A" is closed this means that it is not operating and in this case the step (12-12) sends a "closing fault" alert so as to alert the connected device that is supplying it. If the electric valve "A" is not closed the loop (12-5) allows the connected device to calculate:

$$Dj=D-\Sigma Di$$

Where Dj designates the residual flow rate, D designates the flow rate measured in (12-2) and $\Sigma Di$ designates the sum of the flow rates measured by the flow rate sensors recorded in the list "od". The following step (12-6) checks that the residual flow rate Dj is greater than 0. If yes, the following step (12-7) uses the template developed during the configuration in order to determine if the residual flow rate is within the normal operating zone. If this is not the case the step (12-8) makes it possible to call the alert method.

Figure 13:
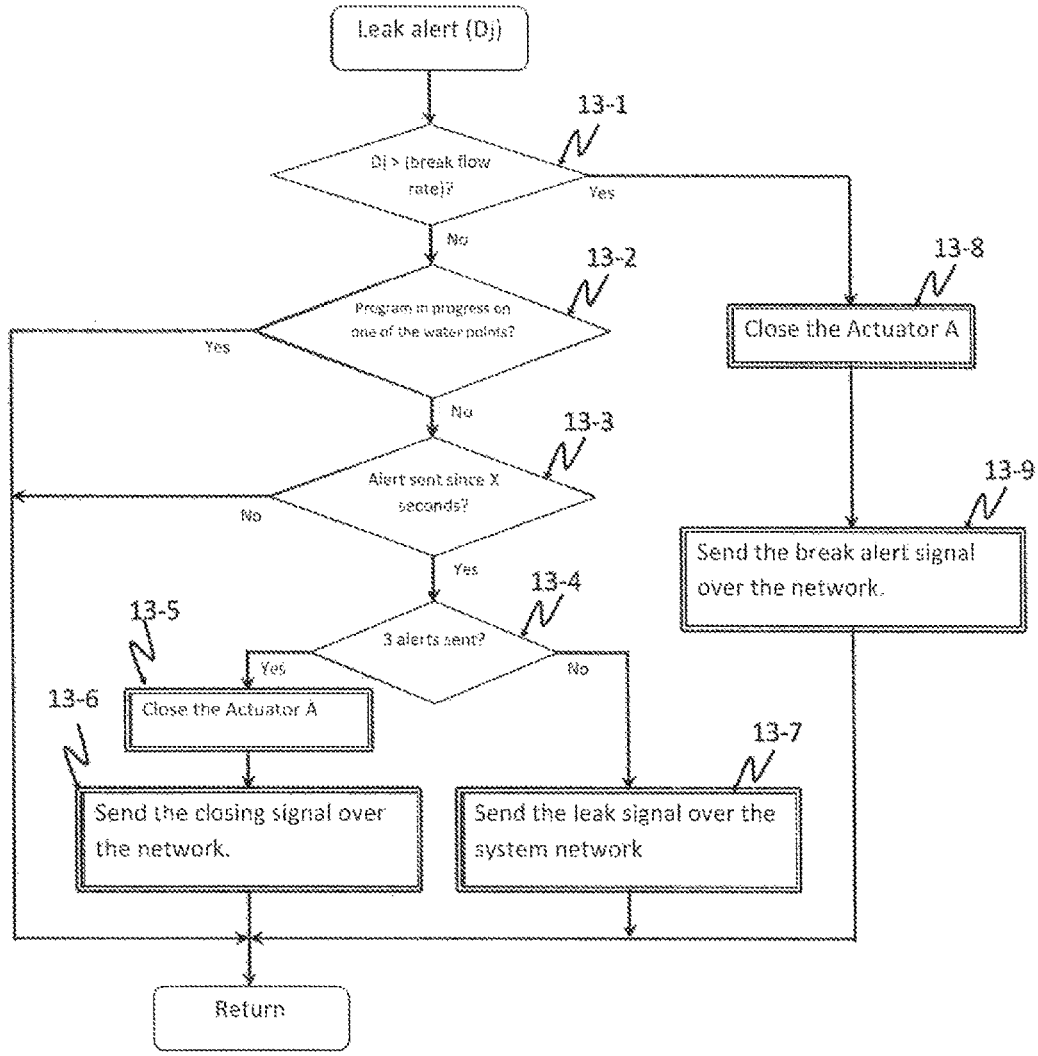
FIG. 13 shows in the form of a flowchart a method for alerting for each flow rate sensor of the connected devices.

FIG. 13 shows in the form of a flowchart an alert method for each flow rate sensor of the connected devices. The first step (13-1) uses the template developed during the configuration in order to determine if the residual flow rate Dj is in the break alert zone. If such is the case, the connected device cuts off the water at the outlet (13-8) and transmits a "break" alert over the system network (13-9) before terminating the method. Otherwise, the step (13-2) checks if a program is in progress on one of the water points. If this is the case the method ends. Otherwise, the step (13-3) checks if an alert has already been sent less than X seconds ago where X represents a reasonable amount of time so that the user has the time to react. The step (13-4) checks if 3 alerts have already been sent for the fault observed. If such is the case the step (13-5) closes the electric valve and the step (13-5) transmits a "closing" alert over the system network before terminating the method. Otherwise the step (13-7) sends a "leak" alert over the system network before ending the method.

The invention claimed is:

1. A scalable home automation system for monitoring, managing and controlling a sanitary facility and elements that comprise said sanitary facility by one or several connected devices that communicate with one another through a system network, said system network able to be physically divided into several sub-networks, comprising one or more of:
   a wireless network, the wireless network using a wireless protocol comprising one or more of Zigbee, Wireless Fidelity (Wi-Fi), or Internet Protocol version 6 over Low-Power Wireless Personal Area Networks (6LoWPAN);
   a wired network, the wired network using a wired protocol comprising one or more of Ethernet, or HomePlug; or
   a mobile network, the mobile network using a mobile protocol comprising one or more of General Packet Radio Service (GPRS), Universal Mobile Telecommunications System (UMTS), or Long-Term Evolution (LTE); and
said one or several connected devices comprises:
   one or more hardware and software to establish a connection over an internet network through the system network;
   an electronic interface comprising:
      a logic processing unit configured to execute a software that allows the logic processing unit to carry out its function or functions;
      hardware and software to communicate with the other connected devices of said system through the system network;
      hardware and software to ensure a repeater functionality in order to extend a range of at least one signal over a transmission support of the system network to provide interconnection of the connected devices;
      hardware and software to ensure a gateway functionality in order to interconnect two sub-system networks each using a different protocol;
      hardware and software in order to communicate with one or more remote terminals that are connected to the Internet, the remote terminals comprising one or more of Smartphones, touchscreen tablets, computers, or servers;
      hardware and software in order to carry out its function or functions by using information communicated by other connected devices;
      hardware and software configured to carry out its function or functions by using the information or commands communicated by the remote terminals connected to the Internet;
      hardware and software configured to transmit alert messages or information to the remote terminals; and
   wherein the system is configured to:
      react to signals sent by one of the connected devices indicating that a valve has not closed or to signals sent by one or more connected devices indicating that at least one of the connected device has detected humidity, and said reaction comprises closing the valve and sending a "closing" alert over the system network;
      measure a flow rate (D) supplied by a flow rate sensor;
      verify the flow rate (D)>0 l/min and returning to the react step otherwise;
      verify that the valve is not closed which means that it is in fault and switch directly to send a "closing fault" alert so as to alert the connected device;
      calculate a residual flow rate (Dj), wherein the residual flow rate (Dj)=the flow rate (D)–a sum of flow rates measured by a flow rate sensor recorded in a list "od" ($\Sigma Di$);
      verify that the residual flow rate (Dj) is greater than 0; and
      apply an alert method as a parameter of the residual flow rate (Dj) on the basis of a determination that the residual flow rate (Dj) is not in a normal operating zone.

2. System according to claim 1 comprising a connected device called a "sensor-actuator" comprising:
   a water inlet fitting at one end and a water outlet fitting at another end which allows for a connection of said "sensor-actuator" connected device on a pipe of the sanitary facility;
   an electric valve, by using an electric signal, configured to control a flow rate of the water circulating in the pipe whereon said "sensor-actuator" connected device is mounted; and
   a flow rate sensor configured to supply an electric signal, said electric signal having at least one characteristic variable according to the flow rate circulating in the pipe whereon said connected device called "sensor-actuator" is mounted.

3. System according to claim 2 wherein the connected device called "sensor-actuator" comprises a pressure sensor configured to supply another electric signal of which at least one of the characteristics varies according to a pressure of the water at the water inlet of said connected device called "sensor-actuator".

4. System according to claim 1 comprising a connected device called "single cut-off sanitary collector", which comprises a plurality of circuit outlets and a single valve and comprising:
   a water inlet fitting at each one of the two ends of said "single cut-off sanitary collector" connected device in order to connect the primary pipe and/or another sanitary collector;
   a fitting for each water outlet on the side of said "single cut-off sanitary collector" connected device that allows for the connecting of the secondary pipes and the installation of said "single cut-off sanitary collector" connected device;

an electric valve, by using an electric signal, configured to control the flow rate of the water circulating to the water outlets of said "single cut-off sanitary collector" connected device; and a flow rate sensor for each water outlet configured to supply an electric signal of which at least one of the characteristics varies according to the flow rate circulating to the water outlet whereon the sensor is connected.

5. System according to claim 4, comprising a connected device called "multi cut-off modular sanitary collector", which comprises a plurality of circuit outlets and a plurality of valves at the water outlet and comprising:

a water inlet fitting at each one of the two ends of said "multi cut-off sanitary collector" connected device in order to connect the primary pipe and/or another sanitary collector;

a fitting for each water outlet on the side of said "single cut-off sanitary collector" connected device that allows for the connecting of the secondary pipes and the installation of said "single cut-off sanitary collector" connected device;

an electric valve for each water outlet, by using an electric signal, configured to control the flow rate of the water circulating to the water outlet whereon the electric valve is connected; and a flow rate sensor for each water outlet configured to supply an electric signal of which at least one of the characteristics varies according to the flow rate circulating to the water outlet whereon the sensor is connected.

6. System according to claim 4, the connected device called "single cut-off modular sanitary collector" comprising:

a single cut-off basic module connected device configured on the basis of the "single cut-off sanitary collector," comprising:

a water inlet fitting allowing for the connection of the primary pipe;

a primary water outlet fitting allowing for the connection of a connected device called "single cut-off additional module";

an electrical connector configured to connect the "single cut-off additional module" connected device to the wired system network supplied by said "single cut-off basic module" connected device;

a secondary water outlet fitting allowing for the connection of a secondary pipe;

an electric valve, by using an electric signal, configured to control the flow rate of the water circulating to the primary water outlet and to the secondary water outlet;

a flow rate sensor configured to supply an electric signal of which at least one of the characteristics varies according to the flow rate circulating to the secondary water outlet;

at least one single cut-off additional module connected device configured on the basis of the "single cut-off sanitary collector" in order to form a sanitary collector allowing for the connection of said "single cut-off modular sanitary collector" connected device and wherein the at least one single cut-off additional module connected device comprises:

a water inlet fitting configured to connect said "single cut-off additional module" connected device to the "single cut-off basic module" connected device or to another "single cut-off additional module" connected device;

an electrical connector configured to connect said "single cut-off additional module" connected device to the wired system by the "single cut-off basic module" connected device or transmitted by another "single cut-off additional module" connected device;

a primary water outlet fitting allowing for the connection of another "single cut-off additional module" connected device;

an electrical connector configured to connect another "single cut-off additional module" connected device to the system network supplied by the "single cut-off basic module" connected device and transmitted by said "single cutoff additional module" connected device;

a secondary water outlet fitting allowing for the connection of a secondary pipe; and a flow rate sensor configured to supply an electric signal of which at least one of the characteristics varies according to the flow rate circulating to the secondary water outlet.

7. System according to claim 5, the connected device called "multi cut-off modular sanitary collector" comprising:

a multi cut-off basic module connected device configured on the basis of the "multi cut-off sanitary collector" device, comprising:

a water inlet fitting allowing for the connection of the primary pipe;

a primary water outlet fitting allowing for the connection of a "multi cut-off additional module" connected device;

an electrical connector configured to connect a "multicut-off additional module" connected device to the wired system network by said "multi cut-off basic module" connected device;

a secondary water outlet fitting allowing for the connection of a secondary pipe;

an electric valve, by using an electric signal, configured to control the flow rate of the water circulating to the secondary water outlet;

a flow rate sensor configured to supply an electric signal of which at least one of the characteristics varies according to the flow rate circulating to the secondary water outlet;

at least one multi cut-off additional module connected device configured on the basis of the "multi cut-off sanitary collector" in order to form a sanitary collector allowing for the connection of said "multi cut-off modular sanitary collector" connected device and wherein each one of said "multi cut-off additional module" connected device comprises:

a water inlet fitting configured to connect said "multi cut-off additional module" connected device to the "multi cut-off basic module" connected device or to another "multi cut-off additional module" connected device;

an electrical connector configured to connect said "multi cut-off additional module" connected device to the wired system provided by the "multi cut-off basic module" connected device or transmitted by another "multi cut-off additional module" connected device;

a primary water outlet fitting allowing for the connection of another "multi cut-off additional module" connected device;

an electrical connector configured to connect another "multi cut-off additional module" connected device to the system network provides by the "multi cut-off basic module" connected device and transmitted by said "multi cut-off additional module" connected device;

a secondary water outlet fitting allowing for the connection of a secondary pipe;

an electric valve, by using an electric signal, configured to control the flow rate of the water circulating to the secondary water outlet; and a flow rate supplying configured to control an electric signal of which at least one of the characteristics varies according to the flow rate circulating to the secondary water outlet.

8. System according to claim 1 comprising a connected device called "simple tap" or "two handles mixing tap" or "single handle mixing tap" comprising:

a water inlet fitting for the "simple tap" or two water inlet fittings for the "single handle mixing tap" or "two handles mixing tap".

9. System according to claim 8 comprising for each water inlet of said called "simple tap" or "two handles mixing tap" or "single handle mixing tap" connected device a flowmeter of the flow rate supplying an electric signal of which at least one characteristics varies according to the flow rate circulating in the water inlet on which the sensor is connected.

10. System according to claim 8 comprising a sensor for the "simple tap" and the "single handle mixing tap" or two sensors for the "two handles mixing tap", with each one of these sensors configured to supply an electric signal of which at least one characteristic varies according to the position of the mechanism of the tap that detects the opening of said tap.

11. System according to claim 10 comprising an electric valve configured, by using an electric signal, to modify the flow rate circulating in said "simple tap" or "two handles mixing tap" or "single handle mixing tap" connected device.

12. System according to claim 8 comprising for each water inlet of said "simple tap" or "two handles mixing tap" or "single handle mixing tap" connected device an electric valve configured to, by using an electric signal, modify a flow rate circulating in said water inlet of the "simple tap" or "two handles mixing tap" or "single handle mixing tap" connected device.

13. System according to claim 1 comprising a connected device called "float valve" comprising:

a water inlet fitting configured to connect said "float valve" connected device on a pipe of the sanitary facility;

a water outlet allowing for filling of the tank;

a float integral with a position sensor configured to measure a level of water in a tank; and an electric valve that, by using an electric signal, configured to control a flow rate of the water circulating to the water outlet.

14. System according to claim 1 comprising a connected device called "sanitary equipment" that integrates an interface that allows the connected device to:

transmit over the system network information on its operating state and on its use of water;

modify its operation according to information that it receives from the other connected devices; and be able to be controlled by means of remote terminals connected to the internet.

15. System according to claim 1 comprising a connected device called "drainage plug" comprising:

either an electric valve provided with a position sensor, by using an electric signal, configured to control the flow rate of the water circulating from the water inlet to the outlet and as such to control the flow of the water in the drain;

or a mechanism comprising a device, by using an electric signal, configured to modify the position of the maneuvering rods so as to raise or lower the drainage plug and as such control the flow of the water in the drain;

a position sensor configured to control the proper opening and the proper closing of the drainage plug.

16. System according to claim 1 wherein the connected device is a humidity sensor.

17. Method of configuring flow rate sensors of a scalable home automation system for monitoring, managing and controlling a sanitary facility and elements, wherein the system comprises:

the sanitary facility by one or several connected devices that communicate with one another through a system network, said system network configured for physically division into several sub-networks, comprising one or more of:

a wireless network, the wireless network using a wireless protocol comprising one or more of Zigbee, Wireless Fidelity (Wi-Fi), or Internet Protocol version 6 over Low-Power Wireless Personal Area Networks (6LoWPAN);

a wired network, the wired network using a wired protocol comprising one or more of Ethernet, or HomePlug; or a mobile network, the mobile network using a mobile protocol comprising one or more of General Packet Radio Service (GPRS), Universal Mobile Telecommunications System (UMTS), or Long-Term Evolution (LTE);

said one or several connected devices comprises:

one or more hardware and software in order to establish a connection over an internet network through the system network;

an electronic interface that comprises:

a logic processing unit configured to execute a software that allows it to carry out its function or functions;

hardware and software in order to communicate with all of the other connected devices of said system through the system network;

hardware and software in order to ensure a repeater functionality in order to extend a range of at least one signal over a transmission support of the system network in order to provide interconnection of all of the connected devices;

hardware and software in order to ensure a gateway functionality in order to interconnect two sub-system networks each using a different protocol;

hardware and software in order to communicate with a remote terminal connected to the Internet, the remote terminal comprising one or more of such as Smartphones, touchscreen tablets, computers, or servers;

hardware and software in order to carry out its function or functions by using information communicated by other connected devices;
hardware and software in order to carry out its function or functions by using the information or commands communicated by the remote terminal connected to the Internet;
hardware and software in order to transmit alert messages or information to the remote terminals;
a "sensor-actuator" comprising:
a water inlet fitting at one end and a water outlet fitting at another end which allows for a connection of said "sensor-actuator" connected device on a pipe of the sanitary facility;
an electric valve, by using an electric signal, controlling a flow rate of the water circulating in the pipe whereon said "sensor-actuator" connected device is mounted;
a flow rate sensor supplying an electric signal, said electric signal having at least one characteristic variable according to the flow rate circulating in the pipe whereon said connected device called "sensor-actuator" is mounted; and
said method comprises:
creating a template with the flow rate (D)=0 l/min ∀ time (t);
detecting the other devices connected to the system;
defining the connected device that integrates the electric valve that supplies with water said flow rate sensor and allowing the logic processing unit to record this electric valve in a variable referred to as "A";
a series of steps of defining the connected devices that are directly supplied with water by said flow rate sensor and allowing the logic processing unit to execute the following algorithm:
record in a first list an electric valve;
record in a second list a flow rate sensor;
record in a third list a humidity sensor; and
a series of steps, by the logic processing unit, developing the template that sets the operating limits for the water points that do not have a dedicated connected device integrating a flow rate sensor and of which the supply with water is directly controlled by said flow rate sensor configured by said method.

18. Method for monitoring flow rate sensors of a scalable home automation system for monitoring, managing and controlling a sanitary facility and elements, wherein the system comprises:
the sanitary facility by one or several connected devices that communicate with one another through a system network,
said system network able to be physically divided into several sub-networks, comprising one or more of:
a wireless network, the wireless network using a wireless protocol comprising one or more of Zigbee, Wireless Fidelity (Wi-Fi), or Internet Protocol version 6 over Low-Power Wireless Personal Area Networks (6LoWPAN);
a wired network, the wired network using a wired protocol comprising one or more of Ethernet, or HomePlug; or
a mobile network, the mobile network using a mobile protocol comprising one or more of General Packet Radio Service (GPRS), Universal Mobile Telecommunications System (UMTS), or Long-Term Evolution (LTE);
said one or several connected devices comprise:
one or more hardware and software in order to establish a connection over an internet network through the system network
an electronic interface that comprises:
a logic processing unit that executes a software that allows it to carry out its function or functions;
hardware and software in order to communicate with all of the other connected devices of said system through the system network;
hardware and software in order to ensure a repeater functionality in order to extend a range of at least one signal over a transmission support of the system network in order to provide interconnection of the connected devices;
hardware and software in order to ensure a gateway functionality in order to interconnect two sub-system networks each using a different protocol;
hardware and software in order to communicate with a remote terminal connected to the Internet, the remote terminals comprising one or more of such as Smartphones, touchscreen tablets, computers, or servers;
hardware and software in order to carry out its function or functions by using information communicated by other connected devices;
hardware and software in order to carry out its function or functions by using the information or commands communicated by the remote terminals that are connected to the Internet;
hardware and software in order to transmit alert messages or information to the remote terminals; and
said method for monitoring comprises:
a reaction step wherein the logic processing unit reacts to signals sent by one of the connected devices indicating that an electric valve has not closed or to signals sent by one of the connected devices indicating that the connected device has detected humidity, and said reaction by the logic processing unit comprises of closing the electric valve "A" and in sending a "closing" alert over the system network;
measuring the flow rate (D) supplied by the flow rate sensor monitored by said method;
verifying the flow rate (D)>0 l/min, and returning to the reaction step otherwise;
verifying that the electric valve "A" is not closed which means that it is in fault and switch directly to send a "closing fault" alert so as to alert the connected device that is supplying it and return to the reaction step;
a series of looped steps calculating a residual flow rate (Dj) wherein the residual flow rate (Dj)=the flow rate (D)–a sum of flow rates measured by the flow rate sensor recorded in a list "od" (ΣDi);
verifying that the residual flow rate (Dj) is greater than 0 and returning otherwise to the reaction step; and
a step that uses a template developed during a configuration in order to apply an alert method as a parameter of the residual flow rate (Dj) on the basis of a determination that the residual flow rate (Dj) is not in a normal operating zone.

19. Alert method of the flow rate sensors of a scalable home automation system for monitoring, managing and controlling a sanitary facility and elements, wherein the system comprises:
- the sanitary facility by one or several connected devices that communicate with one another through a system network,
  - said system network able to be physically divided into several sub-networks, comprising one or more of:
    - a wireless network, the wireless network using a wireless protocol comprising one or more of Zigbee, Wireless Fidelity (Wi-Fi), or Internet Protocol version 6 over Low-Power Wireless Personal Area Networks (6LoWPAN);
    - a wired network, the wired network using a wired protocol comprising one or more of Ethernet, or HomePlug; or
    - a mobile network, the mobile network using a mobile protocol comprising one or more of General Packet Radio Service (GPRS), Universal Mobile Telecommunications System (UMTS), or Long-Term Evolution (LTE);
  - said one or several connected devices comprises:
    - one or more hardware and software in order to establish a connection over an internet network through the system network an electronic interface that comprises:
      - a logic processing unit that executes a software that allows it to carry out its function or functions;
      - hardware and software in order to communicate with all of the other connected devices of said system through the system network;
      - hardware and software in order to ensure a repeater functionality in order to extend a range of at least one signal over a transmission support of the system network in order to provide interconnection of the connected devices;
      - hardware and software in order to ensure a gateway functionality in order to interconnect two sub-system networks each using a different protocol;
      - hardware and software in order to communicate with a remote terminal connected to the Internet, the remote terminals comprising one or more of such as Smartphones, touchscreen tablets, computers, or servers;
      - hardware and software in order to carry out its function or functions by using information communicated by other connected devices;
      - hardware and software in order to carry out its function or functions by using the information or commands communicated by the remote terminals that are connected to the Internet;
      - hardware and software in order to transmit alert messages or information to the remote terminals; and
- said alert method comprises:
  - closing the electric valve "A" and transmitting a "break" alert over the system network before ending the method;
  - checking that no user instruction is in progress and which ends the method otherwise;
  - a step that uses a template developed during a configuration in order to switch to the closing steps based on a determination that the residual flow rate is in the break alert zone or to switch to the checking step based on a determination that the residual flow rate is not in the break alert zone;
  - checking that no alert has already been sent;
  - closing alert steps wherein the connected device cuts off water at the outlet and transmit a closing alert over the system network before ending the method;
  - transmitting a "leak" alert over the system network before ending the method; and
  - switching to the closing alert steps based on a determination that alerts have already been transmitted or switch to the transmitting a leak alert step based on a determination that alerts have not been transmitted.

* * * * *